A. LEHMANN.
NUT AND THREAD PROTECTOR.
APPLICATION FILED FEB. 14, 1917.
1,254,514.
Patented Jan. 22, 1918.
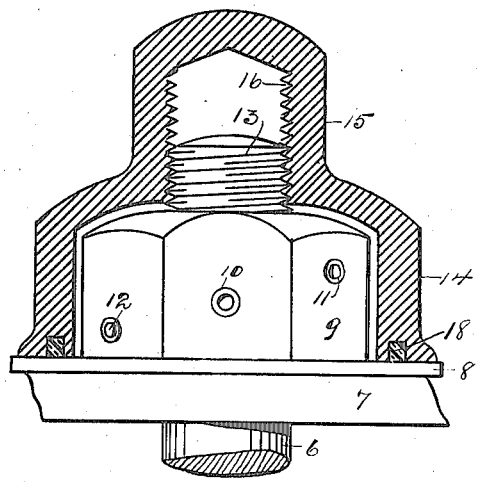
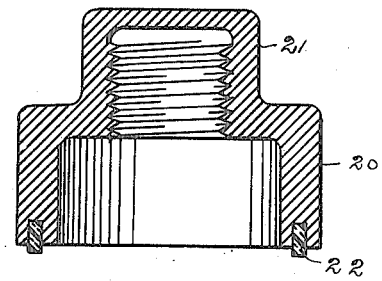
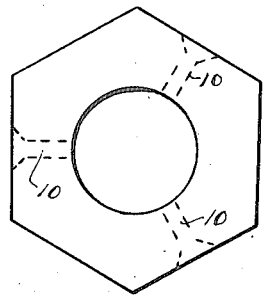
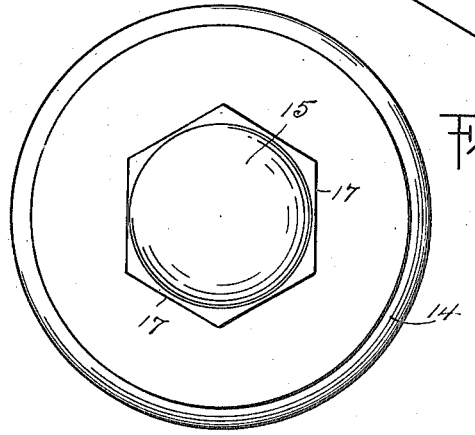
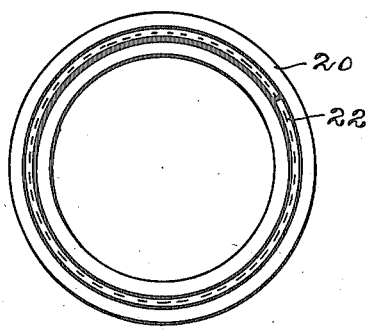
INVENTOR
Adolph Lehmann
BY
Arthur Phelps Marr
ATTORNEY

UNITED STATES PATENT OFFICE.

ADOLPH LEHMANN, OF HICKSVILLE, NEW YORK, ASSIGNOR TO MABEL CHRIST, OF HICKSVILLE, NEW YORK.

NUT AND THREAD PROTECTOR.

1,254,514.      Specification of Letters Patent.      Patented Jan. 22, 1918.

Application filed February 14, 1917. Serial No. 148,686.

*To all whom it may concern:*

Be it known that I, ADOLPH LEHMANN, a subject of the Emperor of Germany, and resident of Hicksville, county of Nassau, State of New York, have invented certain new and useful Improvements in Nut and Thread Protectors, of which the following is a specification.

The device which constitutes the present invention is designed for the purpose of protecting a protruding thread and an exposed nut in bridge or boiler or general machine construction but is especially adapted for submarine use or for use upon nuts and threads that are exposed to moisture, atmospheric conditions, high temperatures or any other condition that will tend to corrode the threads of a bolt or weaken the bolt and nut.

The principal object of my invention is to provide a nut and a means for protecting it which will coöperate in their operation to an extent sufficient to allow the nut to be removed at any time regardless of the conditions under which the nut is called upon to serve.

From the specification which follows and the drawings which accompany this application it is thought that the construction and operation of my device will be fully understood and appreciated.

In the drawings:—

Figure 1 shows in side elevation a nut and a portion of a bolt, the means for protecting the nut and the threads of the bolt being shown in section.

Fig. 2 is a plan view of my device.

Fig. 3 a plan view of a nut.

Fig. 4 a central sectional view of a protector of modified construction.

Fig. 5 a reverse plan view of my protector.

Similar reference numerals indicate like parts in all of the figures where they appear.

In Fig. 1 I show a bolt as indicated at 6. This bolt, which may be of ordinary size or length is shown as extending through a plate 7 and a washer 8.

Upon the outer end of the bolt 6, I place a nut 9, of any ordinary size and in the drawing I have shown a hexagonal nut and it will be noted that although the general dimensions of the nut 9 have not been changed I have provided a plurality of perforations 10, 11 and 12 in certain of the faces of the nut 9. The function of these perforations will be later described. It will be noted that the screw threads 13, of the bolt 6, extend beyond the outer face of the nut 9, and it is upon these projecting screw threads that I secure my protecting device.

My device consists of a cupped member 14, having a screw threaded projection 15, as shown in Fig. 1 and the screw threads 16, of this projection 15, engage upon the screw threads 13, of a bolt 6. The exterior of the projection 15 is hexagonal in shape as shown at 17, in Fig. 2, for the purpose of receiving a wrench by means of which my device may be placed upon or removed from the screw threads of a bolt.

The body portion 14, of my protector consists of a petticoat sufficiently long to entirely cover a nut 9, and at the open or inner edge of the petticoat portion I provide a recess into which I insert a suitable packing member 18. This packing member may be a ring of soft metal or of piston packing or asbestos and from Fig. 4 it will be noted that the packing should project slightly beyond the face of the member 14 and that the pressure which causes the screw threads 16 to engage the screw threads 13 will compress the packing 18, against the washer 8, forcing it back into the recess in the member 14, assuring that a water tight joint will be formed between my device and the washer 8.

I have discovered that in submarine work and in boiler work where it is not necessary to use washers the efficiency of my device is increased by the fact that the nut and projecting screw thread are inclosed in an absolutely water tight casing, thus preventing corrosion or the accumulation of foreign matter.

When it is desirable to remove the nut 9, my protector is first removed by the application of a wrench to the surfaces 17, and then a wrench may be applied to the nut 9. Should it be found that the nut sticks upon the screw thread 13, due to the fact that moisture has followed the screw threads from the inner end of the bolt 6, then a suitable lubricant such as kerosene oil may be applied to the threads of the bolt through the perforations 10, 11 and 12 in the nut 9 and after the oil has been allowed to work around the screw threads the nut may be readily removed.

The use of my device will usually obviate the necessity of splitting away a nut and will often prevent the breaking of a bolt.

As shown in Fig. 3 it will probably only be necessary to drill perforations 10 in alternate faces of a hexagonal nut.

In Fig. 4 I show a device of exactly the same operation as that shown in Fig. 1, but the device shown in Fig. 4 is designed for use with square nuts and therefore the body portion 20 need not be so high. It will also be noted that I have simplified the shape of different portions of the device shown in Fig. 4. The sides and outer surfaces of the body member 20 and projection 21 are flat and the packing 22, is slightly wider than the packing 18, shown in Fig. 1.

These changes merely indicate that modifications may be made within the scope of the appended claim without departing from the principle or sacrificing the advantages of this invention.

For submarine work a quantity of grease of a desirable weight may be placed in the protector and then when the protector is screw threaded over the nut the grease will be caused to enter the perforations 10, 11 and 12, keeping the screw threads always well lubricated. I prefer that the edges of the perforations 10, 11 and 12 should be beveled or chamfered away so that when a nut is roughly handled the perforations 10, 11 and 12, will not be closed by the breaking in of the adjacent portion of the wall of the nut.

Having carefully and fully described my invention what I claim and desire to secure by Letters Patent is:—

The combination with a projecting thread, of a bolt, a perforated nut arranged thereon, a device upon said thread and having a petticoat entirely covering said nut, said petticoat having a recess at the free edge thereof and a packing ring within said recess and compressible therein by the surface engaged by said nut all combined for joint operation as herein specified.

Signed at the city of New York, county and State of New York this 3rd day of Feb. 1917.

ADOLPH LEHMANN.

Witnesses:
   G. E. S. MARR,
   ARTHUR PHELPS MARR.